United States Patent [19]

Occhialini

[11] 4,412,765

[45] Nov. 1, 1983

[54] APPARATUS FOR FACILITATING CHAMFERING/DEBURRING TOOL AND GEAR MESHING

[75] Inventor: Carlo Occhialini, Bologna, Italy

[73] Assignee: Samputensili S.p.A., Bologna, Italy

[21] Appl. No.: 224,031

[22] Filed: Jan. 12, 1981

[30] Foreign Application Priority Data

Jan. 9, 1980 [IT] Italy ................................ 3305 A/80

[51] Int. Cl.$^3$ ........................ B23F 19/06; B23Q 7/00
[52] U.S. Cl. ...................................... 409/6; 29/90 B; 29/159.2; 409/8; 409/49; 72/102
[58] Field of Search ............................ 409/6, 8, 49, 7; 29/90 B, 159.2; 72/102

[56] References Cited

U.S. PATENT DOCUMENTS 2,585,271 2/1952 Praeg ...................................... 409/6

FOREIGN PATENT DOCUMENTS 2331131 1/1975 Fed. Rep. of Germany ........ 409/49
639668 2/1979 U.S.S.R. ,................................... 409/6

*Primary Examiner*—Z. R. Bilinsky
*Attorney, Agent, or Firm*—Karl F. Ross; Herbert Dubno

[57] ABSTRACT

In an apparatus for mutually positioning a toothed chamfering/deburring tool and a gear to be worked, the gear rolls along an inclined rack until engagement with a stop disposed therealong in a predetermined position of the gear relative to the tool, which is formed with a first rotary detent member engageable with a second detent member for locating the tool in a predetermined angular position in which teeth of the tool and the gear can mesh when the tool and the gear are moved into engagement, the tool being rotated by a nozzle directing a stream of liquid against at least one tooth of the tool until the engagement of the first and second detent members.

10 Claims, 4 Drawing Figures

APPARATUS FOR FACILITATING CHAMFERING/DEBURRING TOOL AND GEAR MESHING

FIELD OF THE INVENTION

This invention relates to an apparatus for correcting the meshing between a chamfering-deburring tool and a gear before the beginning of the working operation thereon; the apparatus is formed by a rack complete with a moveable stop for positioning the gear and a ring on the tool with a gauged notch, in which a pawl enters settling the position of the tool with respect to the gear to chamfer and deburr.

BACKGROUND OF THE INVENTION

It is known in the art how in a gear chamfering-deburring operation, if the meshing between the chamfering-deburring tool and the gear is left to chance, since the above mentioned tool is constituted by two bevel gears having a pitch and pressure angle equal to the gear to be worked, at the moment of meshing it is possible to find a tool tooth against a gear tooth, with the consequent impossibility of meshing.

This drawback does not allow work with a fully automatic cycle both with automatic gear loading or unloading, it being necessary for an operator to be present at the beginning of every working cycle, prearranging by hand the chamfering-deburring tool in the correct position with respect to the gear to be worked.

OBJECT OF THE INVENTION

It is an object of the present invention to provide an apparatus that, working with a fully automatic cycle, allows the tool to mesh with the gear or gears in every position with respect to the tool.

SUMMARY OF THE INVENTION

This and other objects of the invention are obtained by rolling the gear to be chamfered and deburred on a rack until engaging a stop in such a way that, with respect to a vertical axis, will always have on the gear a tooth (or a space) located exactly on the center line of such an axis.

The tool is rigidly connected with a circular collar formed with a a notch on the outside circumference thereof located in a fixed position with respect to the tool toothing.

The tool is set in rotation by a liquid stream directed against the toothing to get a turbine effect; the liquid stream also has a cooling and working chip removal function. On the external circumference of the collar a finger rides supported by a spring loaded lever.

When the finger is in alignment with the collar notch, the finger enters the notch by the spring load effect of the lever, forming a collar catch. The finger is positioned in such way that when it enters the notch, the tool presents on the vertical center line thereof a space, if the gear presents a tooth D1 (or vice versa a tooth if the gear presents a space), the tool moving down (or the gear moving up) for the automatic meshing between the tool and the gear. Removing the rack from the gear and the pawl from the collar, the working cycle is begun.

When there is the necessity to work shaft gears or cluster gears, for which it is impossible to achieve alignment with the collar notch of the first embodiment, we increase the notch width, not changing the finger thickness, to a degree on the tool correspondent to a half pitch rotation of the gear.

Two nozzles are set in opposite directions and are connected with a liquid jet reverse valve that works in the following way: a liquid stream sets, for example in clockwise rotation the tools until the pawl enters the collar notch.

If the crown of a gear tooth interferes with the chamfering tool toothing during the tool descent, the tool moves up and a coolant stream from the opposite nozzle rotates it a half pitch in the opposite direction.

The exact clearence determines the notch size and which ensures meshing between the tools and the gears.

BRIEF DESCRIPTION OF THE DRAWING

The above and other objects, features and advantages of the invention will become more readily apparent fom the following description, reference being made to the accompanying drawing, in which.

SPECIFIC DESCRIPTION

Figures 1, 2:
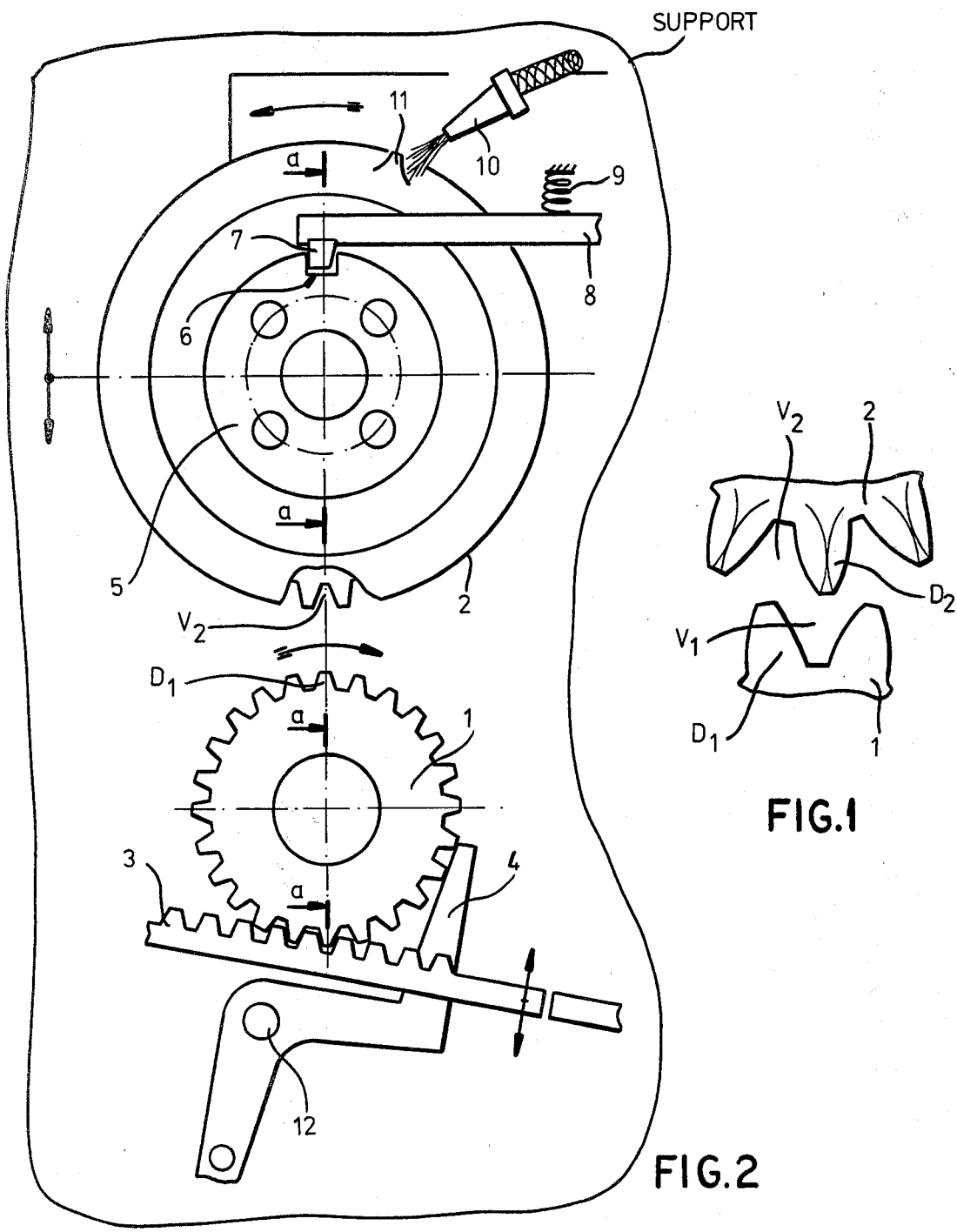
FIG. 1 is an enlarged detail view of the correct meshing position between the chamfering/deburring tool and a gear.
FIG. 2 is a diagrammatic elevational view of the apparatus according to a first embodiment of the invention.

As shown in FIG. 2, the gear 1 rolls on the rack 3 until engagement with the stop 4, a tooth D1 of the gear 1 always in phase with a space between the teeth of the tool. The tool 2 is unitary with the collar 5 on which there is formed a notch 6.

The finger 7, supported by the lever 8, which is spring loaded by the spring 9, enters the notch 6 and arrests the tool 2 in a position in which a space V2 is in phase with a tooth of the gear 1. The tool 2 is set in rotation by the liquid stream from the nozzle 10 directed at the toothing 11.

Figure 4:
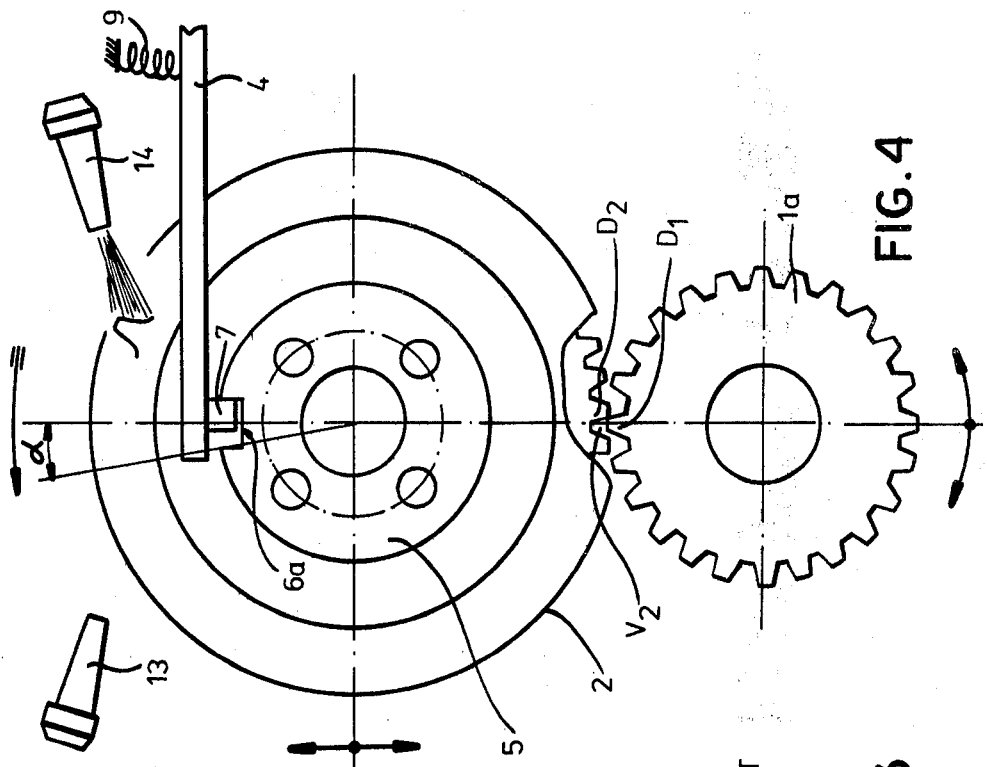
FIGS. 3 and 4 are views similar to FIG. 1, showing a second embodiment of the invention during the meshing process.
Figure 3:
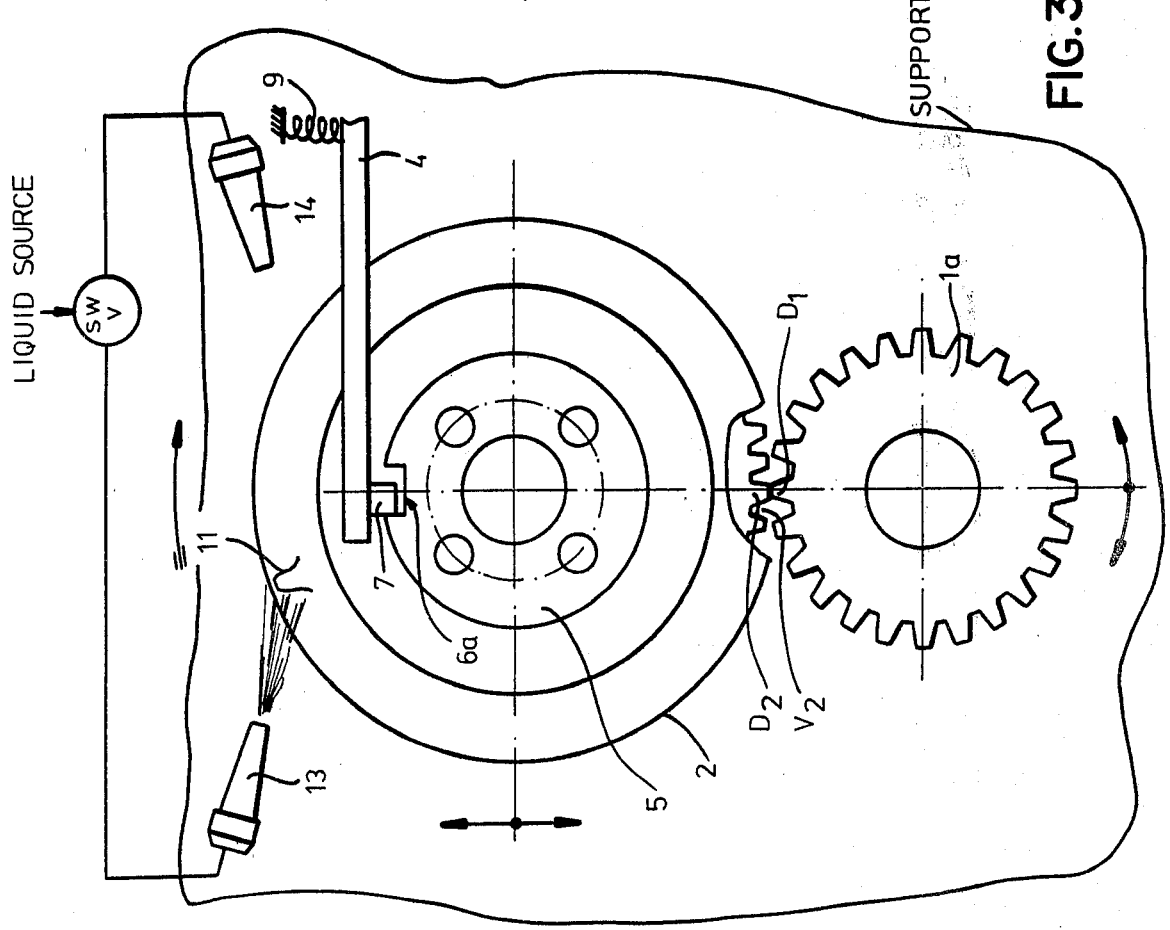

Once the gear 1 and the tool 2 are in the meshing position, the stop 4 swings down around the pin 12, unitary with the rack 3, freeing the gear 1 and to mesh with the tool 2 that has been lowered on the vertical line a—a so that it can be chamfered and deburred. With cluster gears (FIGS. 3 and 4) at the beginning of the cycle there is a liquid stream from the nozzle 13 that (for example) rotates the tools 2 in a clockwise direction until the finger 7 enters the notch 6a, having a width equal to half the gear pitch stopping against the left side thereof. If in this position the teeth D1 of the gears 1a interfer with the teeth of the tools 2, the tools 2 travel up on the vertical line a—a, and a liquid stream from the nozzle 14 (FIG. 4) rotates the tools 2 in a counter-clockwise direction through an angle equal to half the gear pitch, that the finger 7 stops against the right side of the notch 6a.

This displacement corresponds to a half pitch rotation of the tool and consequently the tooth D1 will be in alignment with the space V2 in the optimal condition for the meshing between the chamfering-deburring tool and the cluster gear 1a.

The present invention achieves the purposes proposed and in particular it enables to obtain, at the beginning of the working cycle, the correct positioning of the chamfering-deburring tool with respect to the gear or gears to be worked, without any manual action of the operator.

The present invention, shown and described in a diagrammatic view and extendible to the related variants that are included in the scope of the invention. The materials, the shapes and the sizes used may be of every kind depending upon the need without departing from the range of the present inventive concept.

I claim:

1. An apparatus for mutually positioning a toothed chamfering/deburring tool and a gear to be worked, said apparatus comprising:

a rack for meshing with said gear and providing a guide therefor, whereby said gear rolls along said rack;

a stop disposed along said rack for engaging a gear rolling therealong in a predetermined position of the gear relative to said tool;

a first rotary detent member formed on said tool;

a second detent member engageable with said first detent member for locating said tool in a predetermined angular position in which teeth of said tool and said gear can mesh when said tool and said gear are moved into engagement; and a nozzle for directing a stream of liquid against at least one tooth of said tool for rotation thereof until the engagement of said first and second detent members, said first and second detent members and said rack and gear respectively being disengageable upon the meshing engagement of said tool and said gear.

2. The apparatus defined in claim 1 wherein said first detent member is a collar on said tool formed with a notch on the periphery thereof.

3. The apparatus defined in claim 2 wherein said second detent member is a pawl formed by a spring-loaded lever having a finger engageable in said notch.

4. The apparatus defined in claim 3 wherein said finger is substantially the same width as said notch, whereby said tool is held substantially without any rotary movement thereof during engagement of said first and second detent members.

5. The apparatus defined in claim 1 wherein said gear is vertically disposed with said tool positioned thereabove and engageable with the topside of said gear and said rack is downwardly inclined and engageable with the underside of said gear.

6. An apparatus for mutually positioning a plurality of toothed chamfering/deburring tools with a cluster of an equal number of gears to be worked, said apparatus comprising:

a first rotary detent member formed on one of said tools;

a second detent member engageable with said first detent member for locating said tools in a predetermined angular position in which teeth of at least some of said tools and some of said gears can mesh when said tools and said gears are moved into engagement;

a pair of nozzles oppositely disposed for selectively directing a stream of liquid against at least one tooth of said one of said tools for the rotation thereof until the engagement of said first and second detent members and subsequent to such engagement for mutually positioning the tools and gears; and means for alternately feeding said liquid to said nozzles.

7. The apparatus defined in claim 6 wherein said first detent member is a collar on said one of said tools formed with a notch on the periphery thereof.

8. The apparatus defined in claim 7 wherein said second detent member is a pawl formed by a spring-loaded lever having a finger engageable in said notch.

9. The apparatus defined in claim 8 wherein said notch is substantially wider than said finger, whereby said tools are limitedly rotatable back and forth during the engagement of said first and second detent members.

10. The apparatus defined in claim 9 wherein the width of said notch is equal to one half of the pitch of said gears.

* * * * *